A. J. SEARS.
VEHICLE TOP.
APPLICATION FILED JULY 20, 1914.
1,294,544.
Patented Feb. 18, 1919.
2 SHEETS—SHEET 2.
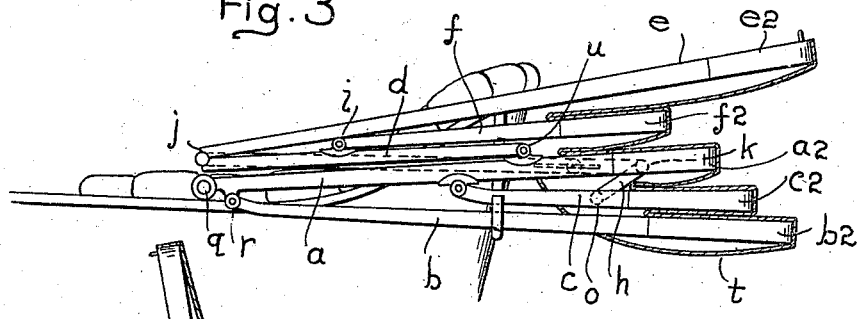
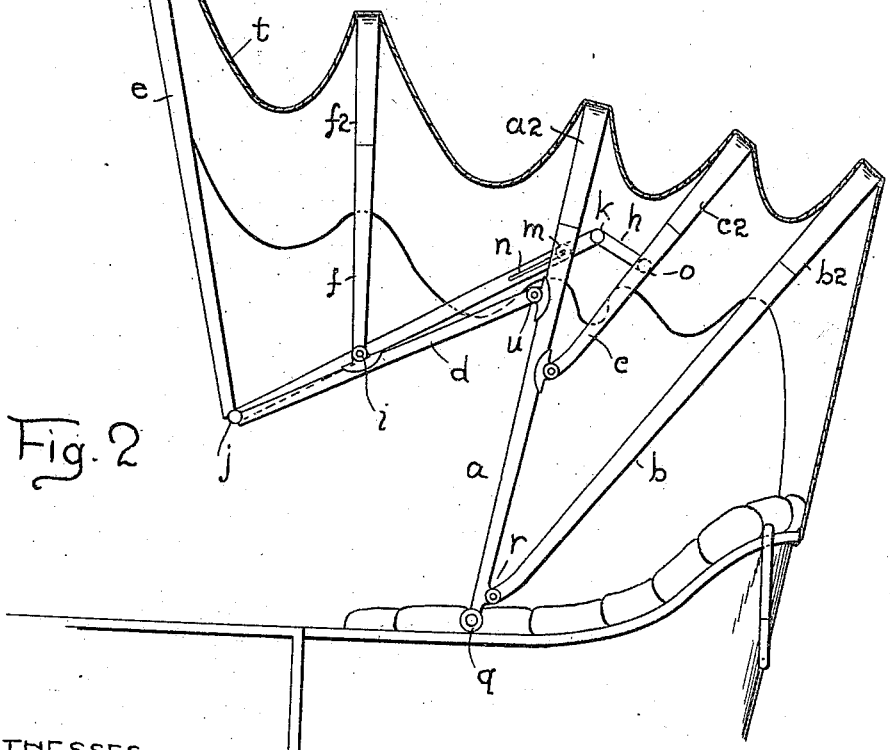
WITNESSES
INVENTOR
Alfred J. Sears
BY
Ralzemond A. Parker.
ATTORNEY

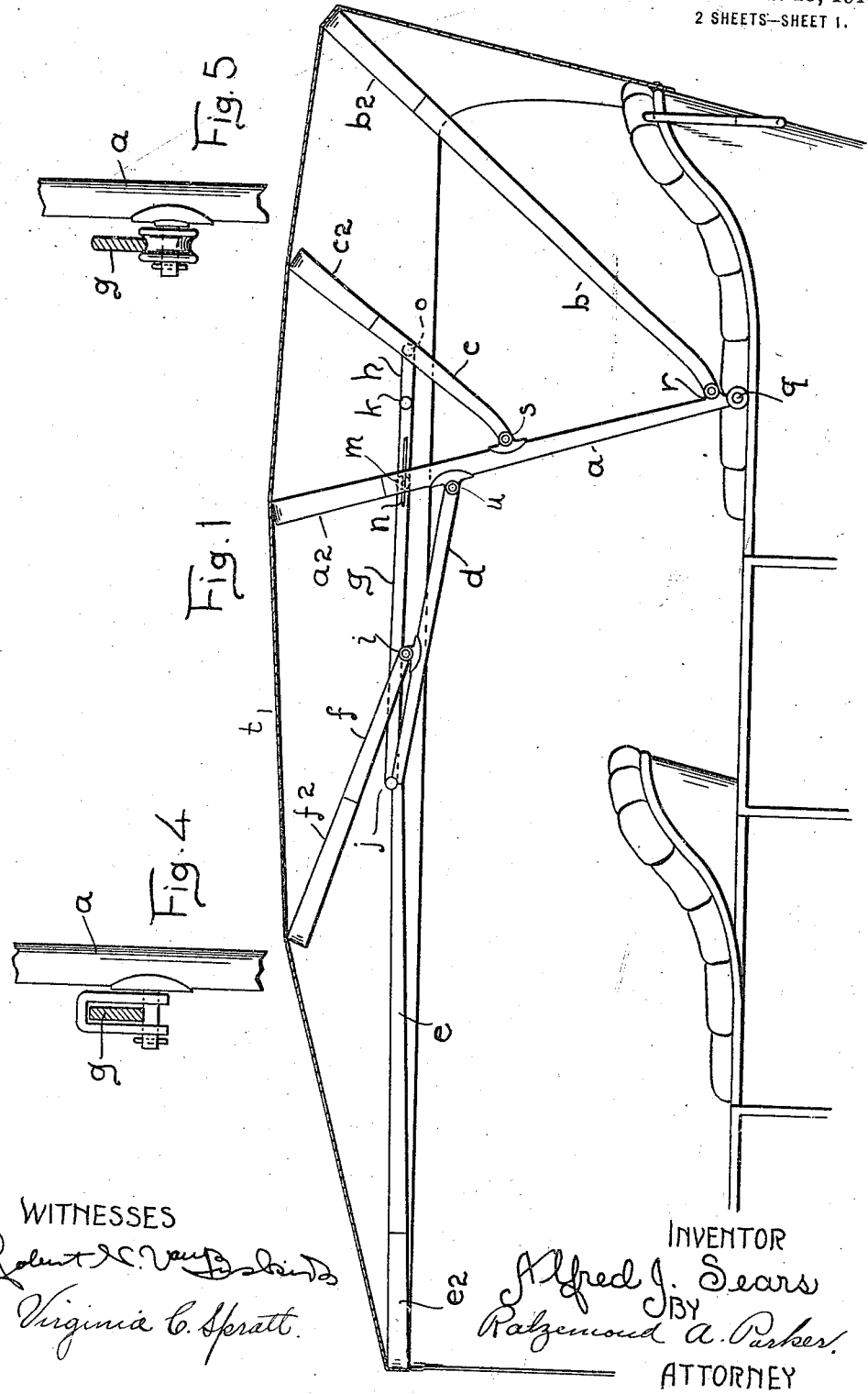

UNITED STATES PATENT OFFICE.

ALFRED J. SEARS, OF DETROIT, MICHIGAN, ASSIGNOR TO DETROIT FORGING COMPANY, OF DETROIT, MICHIGAN, A CORPORATION.

VEHICLE-TOP.

1,294,544.      Specification of Letters Patent.      Patented Feb. 18, 1919.

Application filed July 20, 1914. Serial No. 851,851.

*To all whom it may concern:*

Be it known that I, ALFRED J. SEARS, a citizen of the United States, residing at Detroit, county of Wayne, State of Michigan, have invented a certain new and useful Improvement in Vehicle-Tops, and declare the following to be a full, clear, and exact description of the same, such as will enable others skilled in the art to which it pertains to make and use the same, reference being had to the accompanying drawings, which form a part of this specification.

My invention relates to vehicle tops, and the object of my improvements is to provide an improved top, especially for automobiles, of the kind that is pivoted adjacent to the rear of the vehicle and extends over the forward seat, that may be easily manipulated by one person located inside or outside of the vehicle, and that shall be rigid and firm when in its extended position.

I secure this object in the apparatus illustrated in the accompanying drawings, in which, Figure 1, shows a part of an automobile and a top embodying my invention, the top being in an extended position. The cloth covering for the top is sectional or broken away to show the frame-work more clearly.

Fig. 2, shows the top partly folded or collapsed and

Fig. 3, shows the top in its completely folded collapsed or "clashed" position.

Figs. 4 and 5, show modified detail constructions.

In the following description I shall refer to the part of the frame-work which is bent, and serves to give a form to the cloth covering, as the bow and the supporting standards as the bow sockets.

The construction is the same on both sides of the vehicle, therefore reference will be made to but one side.

$a$ $a^2$ and $b$ $b^2$ are the main bow and sockets pivoted respectively at $q$ and $r$ at the side and adjacent to the rear seat of the vehicle. $c$ $c^2$ is an auxiliary bow and socket pivoted at $s$ to the main bow sockets $a$.

$d$ is an arm or rod pivoted at one end, at $u$, at the forward edge of the main bow socket $a$ extending forwardly and upwardly.

$e$ $e^2$ is a bow and socket, the end of the socket $e$ being pivoted at $j$ to the outer end of the rod $d$ by a knife-joint which permits of the adjacent ends of these parts being bent downward but limits the upward motion to about the position shown in Fig. 1, which is somewhat above a straight line between the outer portion of the bow $e^2$ and the pivot $u$.

$f$ $f^2$ is a bow and socket, the end of the socket being pivoted at $i$ to a lug extending upward from the upper edge of the arm or rod $d$, toward the center of said arm. It will be observed that the line of action of the force upon the socket $f$ is so nearly in line with the pivot $u$ that there will be stable equilibrium when the top is extended and in the position shown in Fig. 1.

$g$ is a rod or arm, the outer end of which is pivoted at $j$ to the inner end of the bow socket $e$ and the outer end of the arm $d$. The rod or arm $g$ is in the form shown in Figs. 2 and 3, and is provided with a slot $n$ through which a pivot pin $m$ which extends from the bow socket $a$, passes and is adapted to slide longitudinally in said slot. This provides a pivoted and sliding joint between the arm $g$ and the bow socket $a$. $h$ is a short link pivoted at one end, at $o$, to the bow socket $c$, and at the other end at $k$, to the rear end of the rod or arm $g$. These parts are so located and arranged that the rod $g$ and the link $h$ shall be substantially in line when the top is in its extended position as shown in Fig. 1, and the pivot $o$ is above the pivot $u$, thus, together, constituting a brace or strut for holding the top in its extended position.

The manner of folding or collapsing the top and the relative positions that the various portions of the frame above described take in folding is shown in Figs. 2 and 3.

Instead of the slot $n$ and pin extending therethrough, a clip secured to the socket $a$ may extend over the rod $g$, as shown in Fig. 4, or said rod may simply rest upon a roller or a bearing on said socket as shown in Fig. 5.

What I claim is:

In a vehicle top, a main bow and socket, an auxiliary bow and socket, a rod pivoted to said main bow socket and extending forwardly, a third bow and socket pivoted to said rod, and a second rod pivoted to the third bow and socket and first mentioned rod, a link pivoted at one end to said second rod and at the other end to said auxiliary bow socket, said second rod being secured to said main bow socket by a pivoted and sliding joint.

In testimony whereof I sign this specification in the presence of two witnesses.

ALFRED J. SEARS.

Witnesses:
VIRGINIA C. SPRATT,
ELLIOTT J. STODDARD.

Copies of this patent may be obtained for five cents each, by addressing the "Commissioner of Patents, Washington, D. C."